(12) United States Patent
Chow

(10) Patent No.: US 6,769,706 B2
(45) Date of Patent: Aug. 3, 2004

(54) PEDAL POWERED SCOOTER

(76) Inventor: Johnny Chow, 1145 Lakewood Road N., Edmonton Alberta (CA), T6K 3A9

( * ) Notice: Subject to any disclaimer, the term of this patent is extended or adjusted under 35 U.S.C. 154(b) by 0 days.

(21) Appl. No.: 10/248,081

(22) Filed: Dec. 17, 2002

(65) Prior Publication Data

US 2003/0111821 A1 Jun. 19, 2003

Related U.S. Application Data

(60) Provisional application No. 60/319,036, filed on Dec. 19, 2001.

(51) Int. Cl.[7] .............................................. B64M 1/00
(52) U.S. Cl. .................. 280/256; 280/253; 280/87.043; 280/265
(58) Field of Search ................ 280/87.01, 0.041–0.043, 280/253, 255–257, 210, 214, 265, 11.115

(56) References Cited

U.S. PATENT DOCUMENTS

| | | | |
|---|---|---|---|
| 3,992,029 A | * 11/1976 | Washizawa et al. | 280/221 |
| 4,026,571 A | 5/1977 | Vereyken | 280/251 |
| 4,088,338 A | 5/1978 | Winchell et al. | 280/220 |
| 4,124,222 A | 11/1978 | Moe et al. | 280/221 |
| 4,145,065 A | 3/1979 | Kupka | 280/87.04 |
| 4,186,934 A | 2/1980 | Collings | 280/221 |
| 4,189,166 A | 2/1980 | Lindsey | 280/234 |
| 4,204,698 A | 5/1980 | Mihalik | 280/87.04 |
| 4,540,192 A | 9/1985 | Shelton | 280/282 |
| 4,653,766 A | 3/1987 | Guandalini | 280/226 |
| 4,750,578 A | 6/1988 | Brandenfels | 180/13 |
| 4,761,014 A | 8/1988 | Huang | 280/256 |
| 4,775,162 A | 10/1988 | Chao | 280/87.04 |
| 4,799,701 A | 1/1989 | Lindau et al. | 280/87.041 |
| 4,828,284 A | * 5/1989 | Sandgren | 280/221 |
| 4,846,488 A | 7/1989 | Szadkowski | 280/221 |
| 4,861,054 A | * 8/1989 | Spital | 280/221 |
| D305,134 S | 12/1989 | Rubio et al. | D21/80 |
| 4,911,457 A | 3/1990 | Ishikawa | 280/240 |
| 4,915,403 A | * 4/1990 | Wild et al. | 280/221 |
| 4,944,360 A | 7/1990 | Sturges | 180/210 |
| 5,039,121 A | 8/1991 | Holter | 280/220 |
| 5,110,148 A | 5/1992 | Stienbarger et al. | 280/221 |
| 5,163,696 A | 11/1992 | Pesco, Sr. | 280/221 |
| 5,192,089 A | 3/1993 | Taylor | 280/221 |
| 5,224,719 A | * 7/1993 | Goodspeed | 280/11.115 |
| 5,224,724 A | 7/1993 | Greenwood | 280/221 |
| 5,310,202 A | * 5/1994 | Goodspeed | 280/221 |
| 5,470,089 A | 11/1995 | Whitson et al. | 280/87.041 |
| 5,520,401 A | 5/1996 | Mohseni | 280/221 |
| 5,697,627 A | * 12/1997 | Schnell | 280/221 |
| 5,785,331 A | 7/1998 | Rappaport | 280/87.01 |
| 5,816,597 A | 10/1998 | Tsai | 280/226 |
| 5,848,660 A | 12/1998 | McGreen | 180/206 |
| 5,927,733 A | 7/1999 | Banda | 280/87.041 |
| 5,971,091 A | 10/1999 | Kamen et al. | 180/218 |
| 6,241,269 B1 | * 6/2001 | Fan | 280/265 |
| 6,334,838 B1 | * 1/2002 | Lee | 482/51 |

* cited by examiner

Primary Examiner—Lesley D. Morris
Assistant Examiner—L. Lum
(74) Attorney, Agent, or Firm—Bennett Jones LLP

(57) ABSTRACT

The following invention is directed to a pedal powered two wheel scooter. The invention discloses a scooter having a steerable front wheel assembly, a rear wheel assembly and a frame linking the front and rear wheel assemblies. The scooter has a drive mechanism comprising front and back crankshafts rotatably attached to the frame and attached to left and right pedals. The front crankshaft transmits power to the rear wheel by means of a front sprocket gear, a continuous chain and a rear sprocket gear. In another embodiment the drive mechanism comprises a front crankshaft rotatably attached to the frame that is also attached to the right and left pedals by means of a freewheel ratchet mechanism with the other end of the right and left pedals attaching to a see-saw bar that pivotally engages the frame in a position between the left and right pedals.

11 Claims, 6 Drawing Sheets

PEDAL POWERED SCOOTER

CROSS-REFERENCE TO RELATED APPLICATIONS

The present invention claims the priority of U.S. Provisional Patent Application No. 60/319,036 filed on Dec. 19, 2001.

BACKGROUND OF INVENTION

Scooters are well known in the art and generally include a platform with a forward wheel and a rear wheel. The forward wheel is pivotally mounted with a pair of handlebars for steering. In a variation on the standard well-known scooter, various types of drives have been adapted to the scooter with an extra wheel and a drive axle added at the rear thereof in order to provide increased stability. In the prior art, one approach to driving these scooters with a mechanical drive teaches the use of a pair of reciprocating treadles, each of which has an end pivotally secured in a fixed position while the other end oscillates in some manner, generally up and down, to drive a crank axle or the like. In some prior art devices, ratchet mechanisms are used to ensure that the vehicle is driven in only the forward direction. One other prior art device eliminates the generally fixed pivotal mounting of the treadle ends and instead mounts those treadle ends with a second, non-functional, crank arm arrangement such that the treadles maintain their generally horizontal orientation to a much greater extent as the treadles are reciprocated. These pedal or treadle powered scooters operate with a pair of rear wheels and are in effect modified tricycles.

Pedal powered two-wheeled scooters are known but only utilize a single pedal or treadle, as exemplified in U.S. Pat. Nos. 4,124,222 or 5,163,696.

SUMMARY OF INVENTION

The present invention is directed to a pedal powered scooter.

Accordingly, in one aspect of the invention, the invention comprises a scooter having a steerable front wheel assembly, a rear wheel assembly and a frame linking the front and rear wheel assemblies and including a drive mechanism comprising:

(a) a front crankshaft rotatably attached to the frame and comprising a left crank arm and a right crank arm;

(b) a rear crankshaft rotatably attached to the frame and comprising a left crank arm and a right crank arm;

(c) a left pedal comprising a platform rotatably attached to the front left crank arm and the rear left crank arm;

(d) a right pedal comprising a platform rotatably attached to the front right crank arm and the rear right crank arm; and (e) wherein the front crankshaft transmits power to the rear wheel by means of a front sprocket gear, a continuous chain and a rear sprocket gear.

In one embodiment both the left and right rear crank arms are longer than both of the left and right front crank arms and each of the left and right pedal assemblies has a means for slidably adjusting the length of the pedal. In another embodiment the frame is comprised of a top tube, a trailing arm hingedly attached to the top tube and resilient means disposed between the top tube and the trailing arm with the rear wheel assembly being attached to the trailing arm. The resistance means may be a coil spring. In a further embodiment the steerable front wheel assembly is hingedly attached to the top tube of the frame, allowing the scooter to be folded flat. In another embodiment the rear wheel assembly may be linked to the frame at a point midway between the rear and front crankshafts. In this embodiment two laterally spaced front wheels may be used to increase stability.

In another aspect of the invention, the invention comprises a two-wheeled scooter having a steerable front wheel assembly, a rear wheel assembly and a frame linking the front and rear wheel assemblies and including a drive mechanism comprising:

(a) a front crankshaft rotatably attached to the frame;

(b) a left pedal comprising a platform and a collar attached to a front end of the platform, the collar being attached to the front crankshaft by a freewheel ratchet mechanism;

(c) a right pedal comprising a platform and a collar attached to a front end of the platform, the collar being attached to the front crankshaft by a freewheel ratchet mechanism; and (d) a seesaw bar pivotally attached to a rear end of the right pedal platform and to a rear end of the left pedal platform, the bar pivotally engaging the frame between the left and right pedals.

BRIEF DESCRIPTION OF DRAWINGS

The invention will now be described by way of an exemplary embodiment with reference to the accompanying simplified, diagrammatic, not-to-scale drawings. In the drawings.

DETAILED DESCRIPTION

The present invention provides for a pedal powered two-wheeled scooter. When describing the present invention, all terms not defined herein have their common art-recognized meanings.

Figure 1:
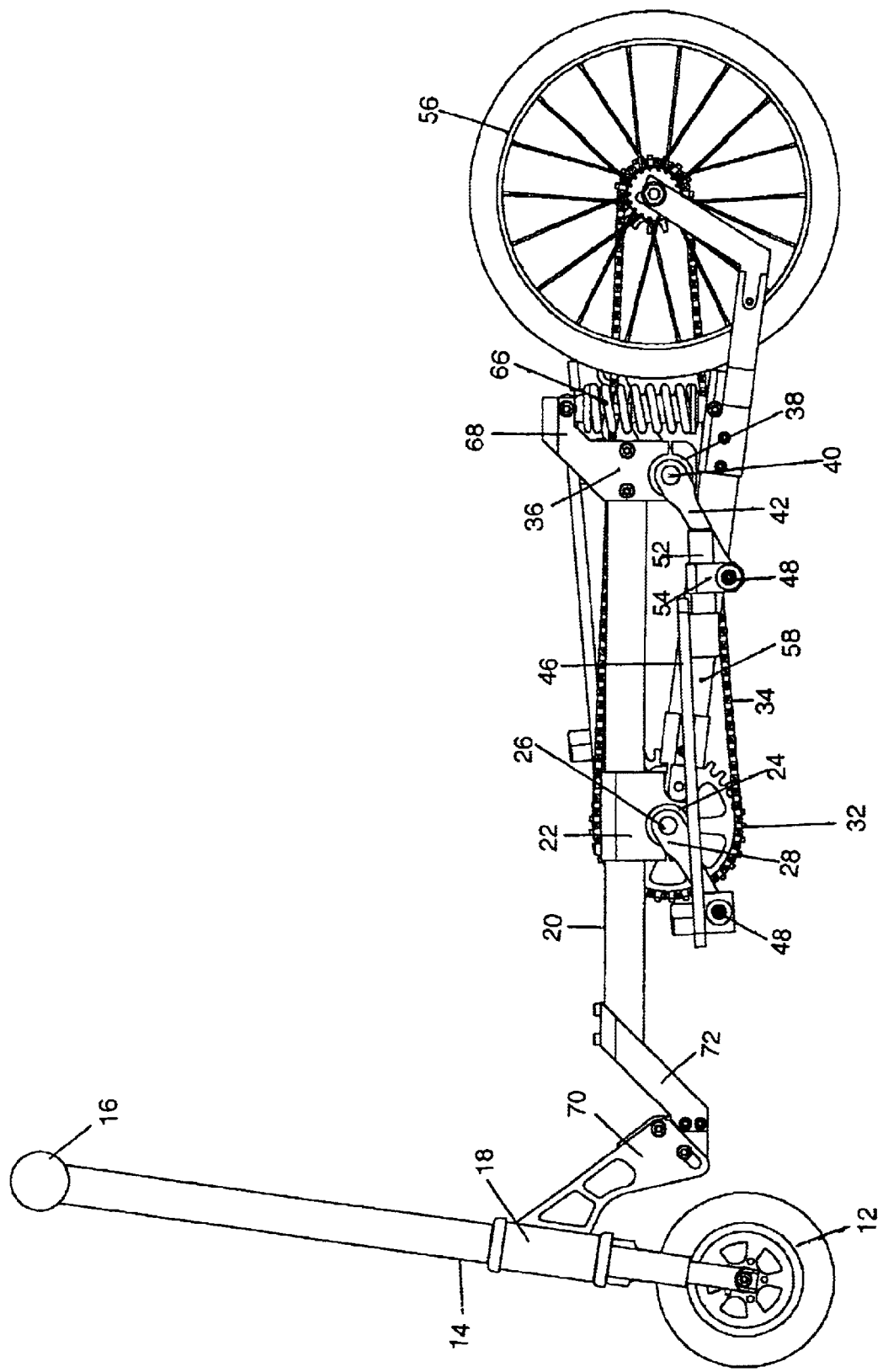
FIG. 1 is a side view of one embodiment of the present invention.

The apparatus (10) shown in FIG. 1 comprises a scooter having the general configuration of well-known scooters including a steerable front wheel assembly which comprises a front wheel (12), a front axle (13), a handlebar stem (14) and handlebars (16). The handlebar stem rotates within a sleeve (18), as is well known in the art. The frame of the scooter includes a top tube (20) which forms the backbone of the scooter. A front crank collar (22) is affixed to the top tube (20) and includes a front bearing assembly (24) for the front crank axle (26). Front left (28) and right (30) crank arms are provided as is well-known in the bicycle art. A front sprocket gear (32) is affixed to the front crank axle (26) for driving the chain (34).

A rear crank collar (36) is affixed to the rearward end of the top tube (20) and includes a rear bearing assembly (38) for the rear crank axle (40). Rear left (42) and right (44) crank arms are provided in like manner as the front crank assembly. A left pedal (46) links the front left crank arm (28) and the rear left crank arm (42) by front and rear rotating pedal attachments (48). The right pedal (50) is similarly assembled. The crank arms are synchronized so that the pedals travel in substantially circular paths, turning the front sprocket (32). In a preferred embodiment, the rear crank arms (42, 44) are slightly longer than the front crank arms (28, 30) such that the pedals are horizontal when the cranks arms are horizontal, and slightly inclined back to front when the crank arms are vertical. While the pedalling motion is still circular, a slight "heel-toe" rocking motion is imparted to the pedals. A similar result may be achieved if the front crank arms are longer than the rear crank arms. Because the distance between the front and rear pedal attachments to the ends of the crank arms varies in such embodiment, the pedal must include a sliding rod (52) and a collar (54) to accommodate the varying length.

The rear wheel (56) may simply attach to the end of the top tube (20). However, in a preferred embodiment, a trailing arm (58) links to the front crank collar (22) below the top tube (20) and extends rearwardly. Left and right fork extensions (60) extend upwardly from the end of the trailing arm (58) on either side of the rear wheel (56) and terminate in the rear axle attachment (62). The rear wheel (56) includes a freewheel ratchet hub including a drive sprocket (64) which meshes with the chain (34). Shock absorbing means (66) may then be disposed between the top tube (20) and the trailing arm (58). The shock absorbing means may also comprise energy damping elements in addition to a resilient element such as coil spring (66). The damping elements may include well-known automotive "shock absorber" designs. The resilient element (66) may be a resilient polymer or rubber block, or a pneumatic unit. In order to allow a shock absorbing means of greater length, increasing the suspension travel of the rear wheel, the top mounting point of the shock absorbing means may be moved upwards by a vertical extension member (68). It is convenient to combine the vertical extension member (68) and rear crank collar (36) in the same piece, as is shown in the Figures.

As is apparent to one skilled in the art, the drive mechanism of the present invention is very similar to well known bicycle chain drives, with the addition of the rear crank assembly. The gearing may be varied by varying the length of the front crank arms, the diameter of the front or rear sprockets, and the diameter of the rear wheel. It is conceivable to add a rear multi-sprocket and a rear derailleur similar to those found on multi-speed bicycles to permit gear changing by the user.

The front wheel handle bar assembly may hingedly attach to the top tube (20) permitting the scooter to fold flat when not in use. In one embodiment, the collar (18) includes a bracket (70) which hingedly attaches to an extension (72) attached to the front end of the top tube. Means for locking the handlebar assembly in the upright position must of course be provided to allow for safe operation.

Figure 2A:
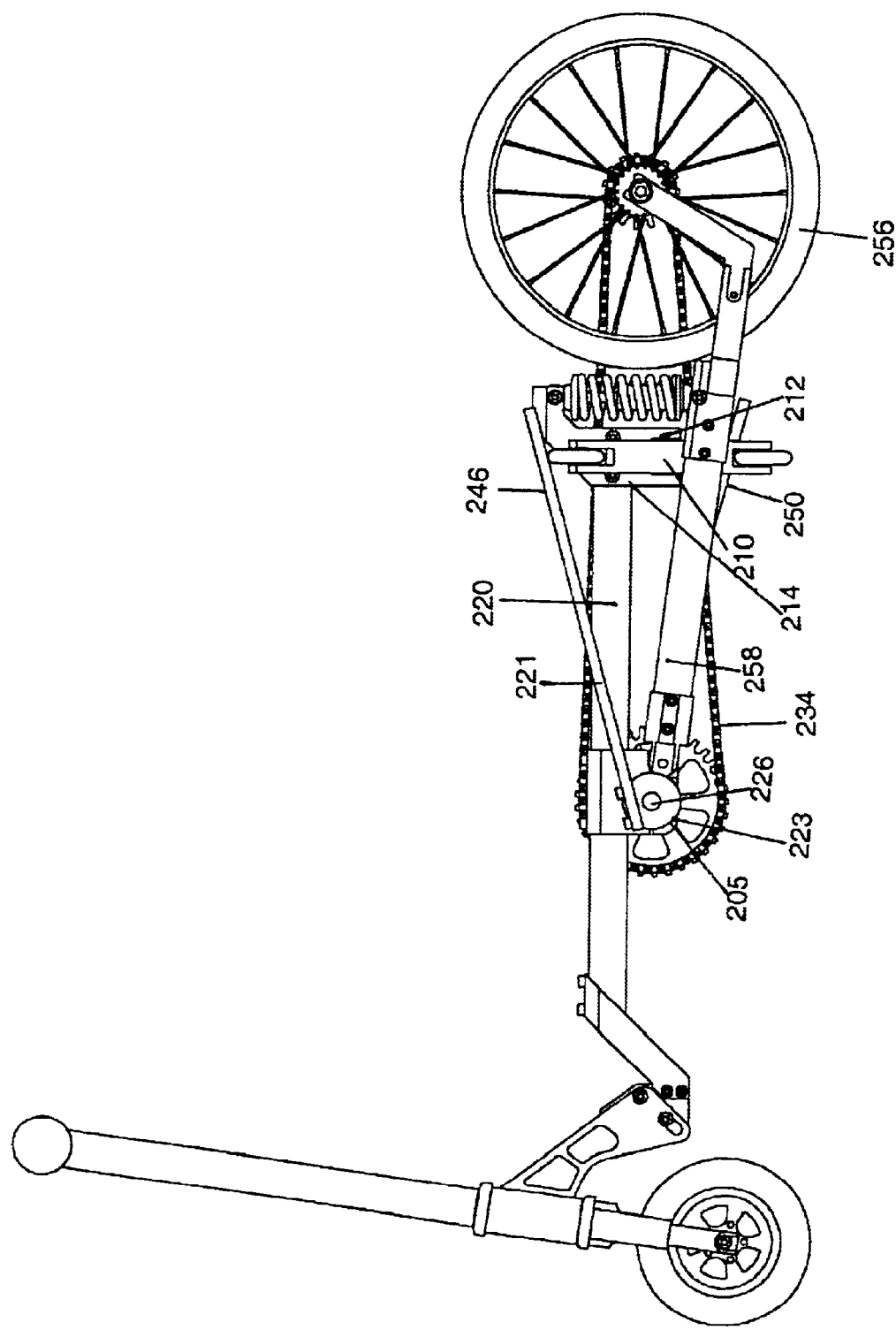
FIG. 2A is a side view of an alternative embodiment.
Figure 2B:
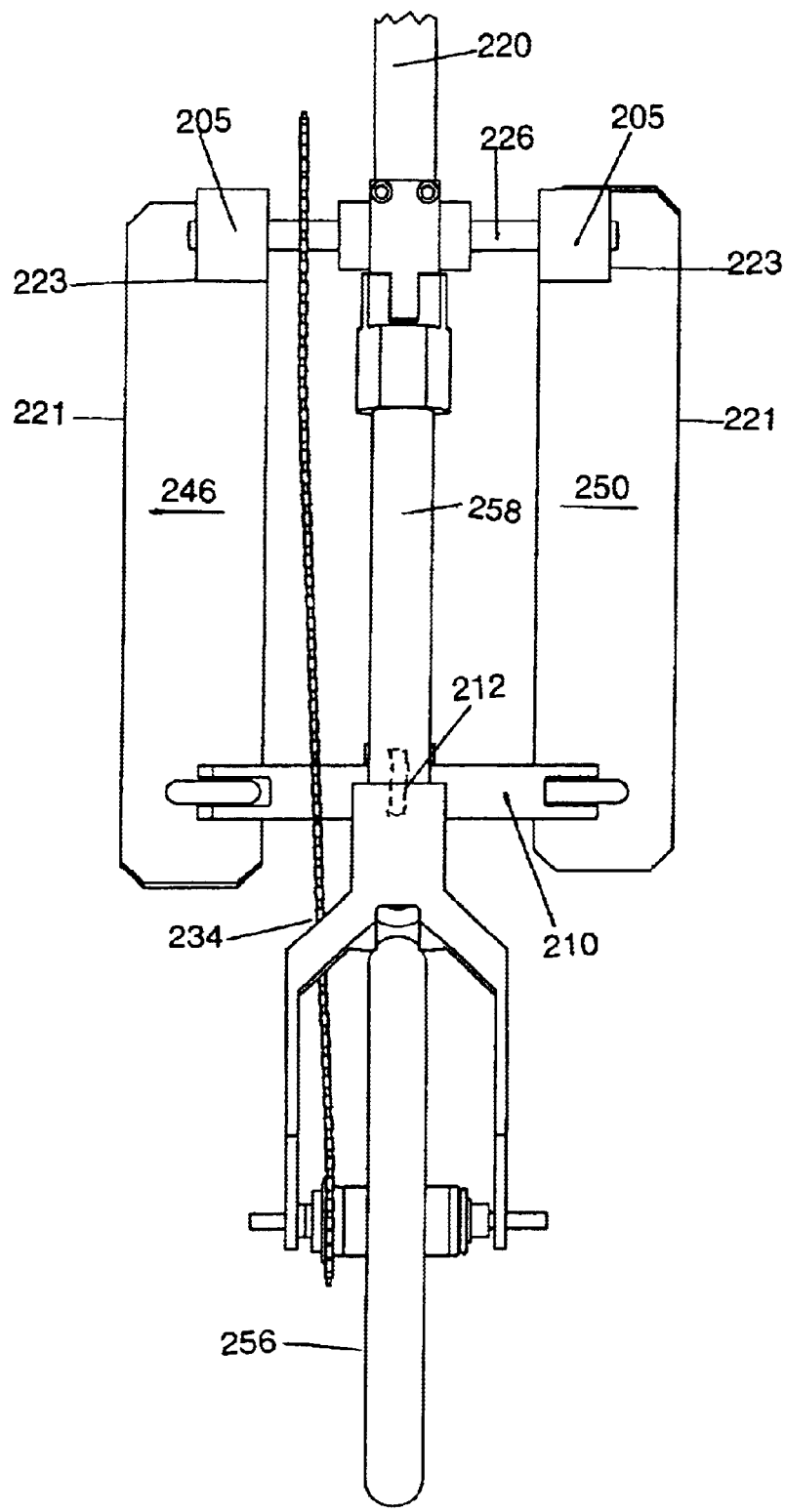
FIG. 2B is a bottom view of the embodiment of FIG. 2A.
Figure 2C:
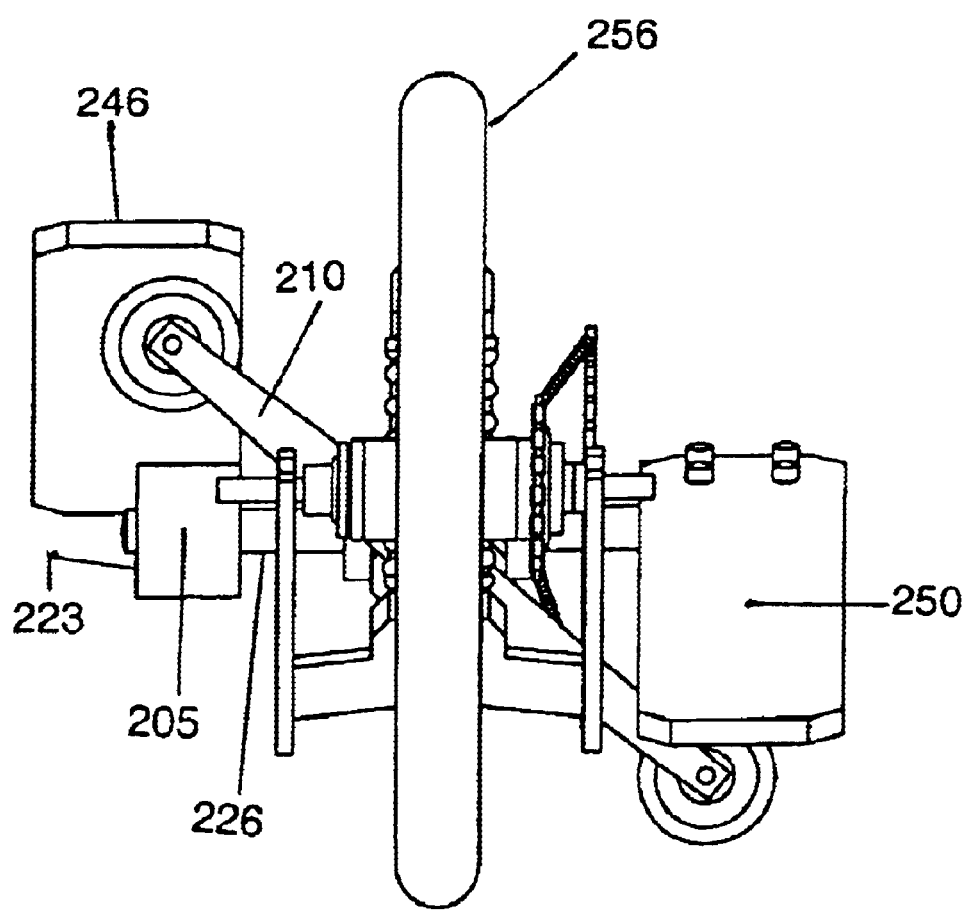
FIG. 2C is a rear view of the embodiment of FIG. 2A and 2B.

In an alternative embodiment, the pedals do not attach to rotating crank arms but rather operate as levers with a ratcheting action. As shown in FIGS. 2A, B, and C, the pedals (246, 250) drive the front crank axle (226) by a freewheel ratchet mechanism. As used herein, the term "freewheel" means that the pedal may move in one direction without driving the axle. The term "ratchet" means that the pedal will actuate the axle when moved in the direction opposite the freewheel direction. The pedals each are comprised of a platform (221) and a collar (223) which is attached to the front end of the platform (221). The collar (223) attaches to a freewheel hub (205) which drives the front axle (226) by a ratcheting action. The pedals freewheel when moving downwards and engages the axle on the upward stroke. At the rear of each pedal platform, a see-saw bar (210) attaches transversely across the scooter and pivotally attaches to the rear end of each pedal, as shown in FIG. 3. The seesaw bar (210) transmits energy to the pedal stroking upwards from the pedal stroking downwards, under the users weight The seesaw bar (210) pivotally engages a fulcrum pin (212) suspended or otherwise attached to a mounting collar (214) which is attached to the rear end of the top tube (220). As in the embodiment shown in FIG. 1, the mounting collar (214) extends upwards to provide an upper mounting point for a suspension assembly. The seesaw bar (210) bar may pass over the trailing arm (258). The front axle (226) may then transmit energy to the rear wheel (256) by means of a conventional chain (234) drive. Alternatively, a chain drive for the front wheel may be provided, or to both the front and rear wheels.

Figure 3A:
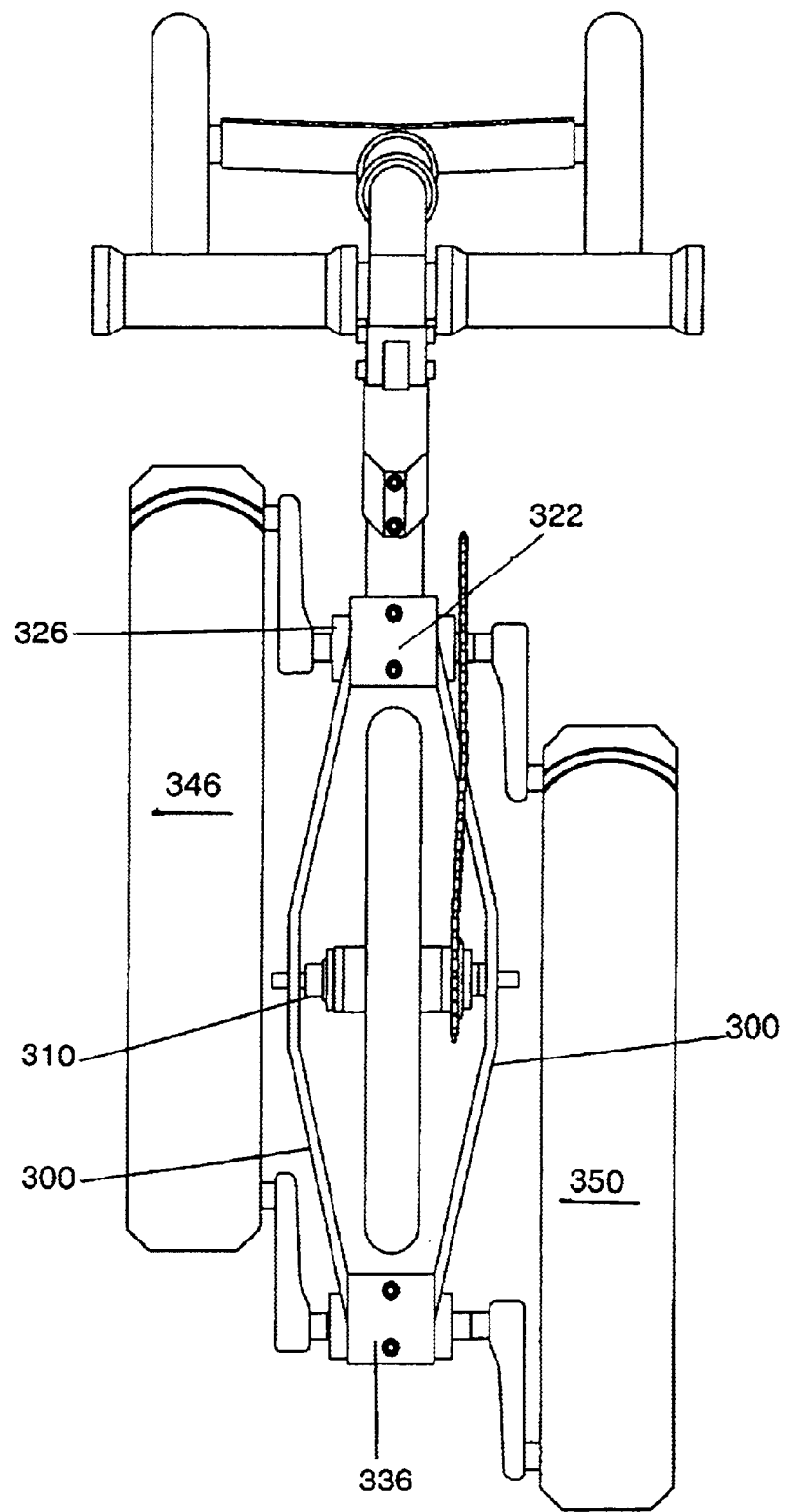
FIG. 3A is a bottom view of another alternative embodiment.
Figure 3B:
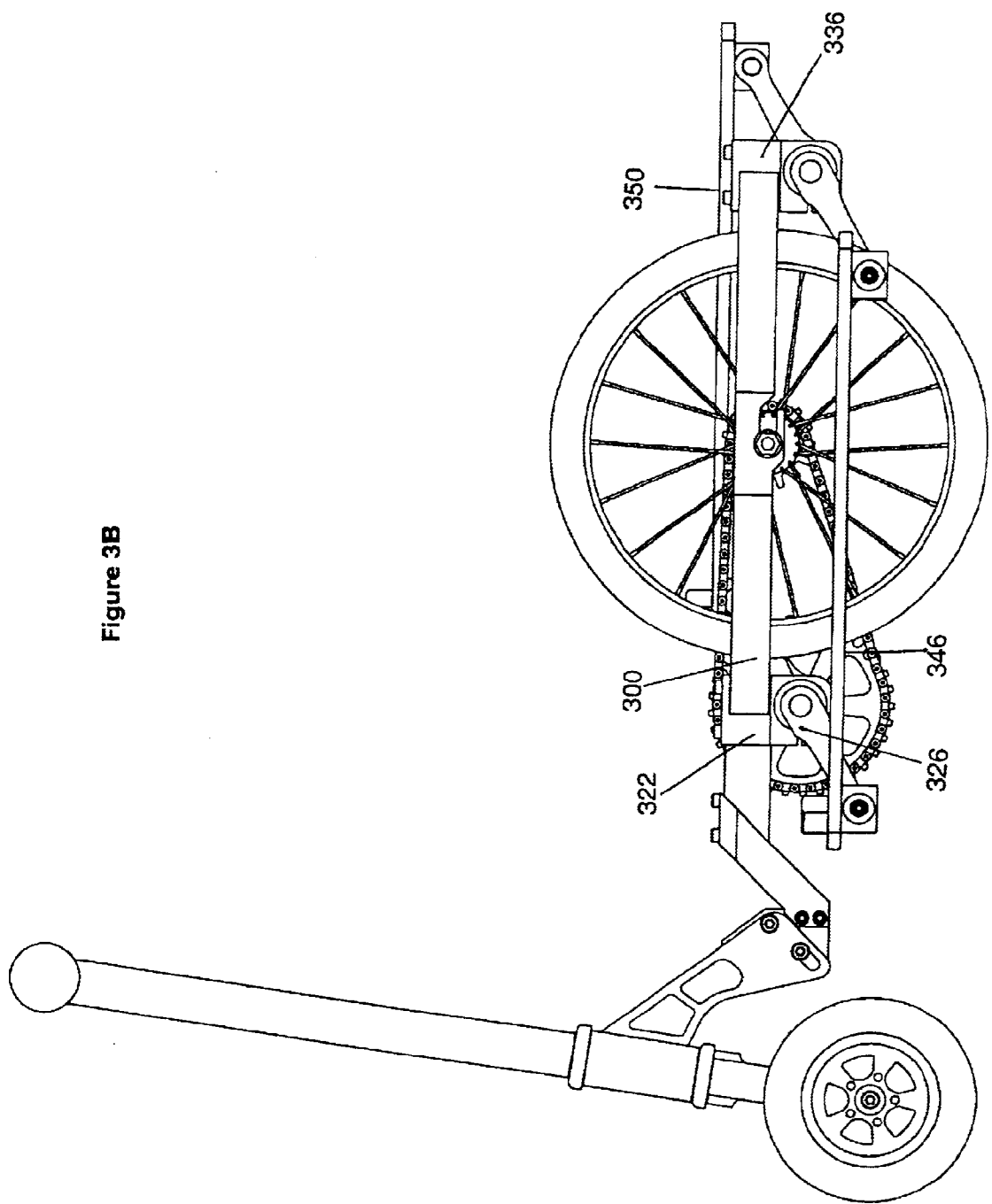
FIG. 3B is a side view of the embodiment of FIG. 3A.

FIGS. 3A and 3B illustrate a short wheel base version of the present invention. In this embodiment, the pedal drive is similar to that described above and illustrated in FIG. 1. However, the rear wheel assembly is moved forwards to an attachment point approximately midway between the pedals (346, 350). A front bracket (322) provides the connection for the front crank assembly (326) and for the rear stays (300) which bow outward and terminate in the rear bracket (336). The rear crank assembly (340) is attached to the rear bracket (336). The rear wheel axle (310) mounts to the stays in conventional fashion. Optionally, two front wheels, laterally spaced, are provided to add stability for ease of use, as shown in FIG. 3A.

As will be apparent to those skilled in the art, various modifications, adaptations and variations of the foregoing specific disclosure can be made without departing from the scope of the invention claimed herein.

What is claimed is:

1. A scooter having a steerable front wheel assembly, a rear wheel assembly and a frame linking the front and rear wheel assemblies and including a drive mechanism comprising:
    (a) a front crankshaft rotatably attached to the frame and comprising a left crank arm and a right crank arm;
    (b) a rear crankshaft rotatably attached to the frame and comprising a left crank arm and a right crank arm;
    (c) a left pedal comprising a platform rotatably attached to the front left crank arm and the rear left crank arm;
    (d) a right pedal comprising a platform rotatably attached to the front right crank arm and the rear right crank arm; and
    (e) wherein either or both the front crankshaft and the rear crankshaft transmits power to the rear wheel by means of a front sprocket gear, a continuous chain and a rear sprocket gear attached to the rear wheel.

2. The scooter of claim 1 wherein the rear left and right crank arms are longer than the front left and right crank arms and each of the left and right pedal assembly comprises means for slidably adjusting the length of the pedal.

3. The scooter of claim 1 wherein the frame comprises a top tube, a trailing arm hingedly attached to the top tube, and resilient means disposed between the top tube and the trailing arm, wherein the rear wheel assembly is attached to the trailing arm.

4. The scooter of claim 3 wherein the resilient means comprises a coil spring.

5. The scooter of claim 1 wherein the steerable front wheel assembly is hingedly attached to the top tube, permitting the scooter to be folded flat.

6. The scooter of claim 1 wherein the rear wheel assembly is linked to the frame at a point between the rear crankshaft and the front crankshaft.

7. The scooter of claim 6 wherein the scooter has two laterally spaced front wheels.

8. A two-wheeled scooter having a steerable front wheel assembly, a rear wheel assembly and a frame linking the front and rear wheel assemblies and including a drive mechanism comprising:

(a) a front crankshaft rotatably attached to the frame;

(b) a left pedal comprising a platform and a collar attached to a front end of the platform, the collar being attached to the front crankshaft by a freewheel ratchet mechanism;

(c) a right pedal comprising a platform and a collar attached to a front end of the platform, the collar being attached to the front crankshaft by a freewheel ratchet mechanism;

(d) a seesaw bar pivotally attached to a rear end of the right pedal platform and to a rear end of the left pedal platform, the bar pivotally engaging the frame between the left and right pedals; and (e) means for transmitting power from the front crankshaft to either or both of the front wheel or rear wheel.

9. The scooter of claim 8 wherein the frame comprises a top tube, a trailing arm hingedly attached to the top tube, and resilient means disposed between the top tube and the trailing arm, wherein the rear wheel assembly is attached to the trailing arm.

10. The scooter of claim 9 wherein the resilient means comprises a coil spring.

11. The scooter of claim 8 wherein the steerable front wheel assembly is hingedly attached to the top tube, permitting the scooter to be folded flat.

* * * * *